US010234176B2

(12) United States Patent
Gotsmann et al.

(10) Patent No.: US 10,234,176 B2
(45) Date of Patent: Mar. 19, 2019

(54) SOLID-STATE LATENT HEAT PUMP SYSTEM

(71) Applicant: International Business Machines Corporation, Armonk, NY (US)

(72) Inventors: Bernd W. Gotsmann, Horgen (CH); Fabian Menges, Urdorf (CH)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 15/240,098

(22) Filed: Aug. 18, 2016

(65) Prior Publication Data

US 2018/0051917 A1    Feb. 22, 2018

(51) Int. Cl.
| | |
|---|---|
| *F25B 21/02* | (2006.01) |
| *F25B 23/00* | (2006.01) |
| *F25B 21/04* | (2006.01) |
| *G06F 1/20* | (2006.01) |

(52) U.S. Cl.
CPC .............. *F25B 23/00* (2013.01); *F25B 21/04* (2013.01); *G06F 1/206* (2013.01); *F25B 2321/0212* (2013.01)

(58) Field of Classification Search
CPC .......... F25B 23/00; F25B 21/04; F25B 21/02; F25B 21/00; F25B 2321/0212; F28D 20/02; F28D 20/028; H01L 45/06; H01L 23/34; H01L 2225/06589; G06F 1/206
USPC .......................................................... 62/3.7
See application file for complete search history.

(56) References Cited

U.S. PATENT DOCUMENTS

| | | | |
|---|---|---|---|
| 7,628,021 B2 | 12/2009 | McPherson | |
| 8,013,318 B2 | 9/2011 | Rho | |
| 8,109,324 B2 | 2/2012 | Farid | |
| 2012/0247707 A1* | 10/2012 | Surdeanu | ............... F21V 29/00 165/10 |

(Continued)

OTHER PUBLICATIONS

Hong, Yan, "Encapsulated Nanostructured Phase Change Materials for Thermal Management" (2011). Electronic Theses and Dissertations. Paper 2052. Ph. D. Dissertation, University of Central Florida. pp. i-xv and 1-191.

(Continued)

*Primary Examiner* — Joseph Trpisovsky
(74) *Attorney, Agent, or Firm* — Daniel P. Morris; Otterstedt, Ellenbogen & Kammer, LLP

(57) ABSTRACT

A heat pump system includes a structure, in turn including a solid-state phase change material. The solid-state phase change material has a first phase state and a second phase state dependent on the temperature. A heat source is configured to supply heat to a first area of the structure, thereby creating a first domain having the first phase state and thereby storing latent heat in the first domain. The first domain is separated by domain walls from second domains having the second phase state. A heat sink is configured to receive heat from a second area of the structure. Furthermore, an electrical energy supply is configured to supply an electrical current to the structure, thereby moving the first domain and the corresponding latent heat stored in the first domain along the structure from the first area to the second area. A related thermal computing device, a related method, and a related computer program product are also disclosed.

20 Claims, 6 Drawing Sheets

(56) References Cited

U.S. PATENT DOCUMENTS

2014/0029203 A1    1/2014  Joshi
2016/0205761 A1*  7/2016  Dede ...................... H01L 23/36
                                                                             361/717

OTHER PUBLICATIONS

Anonymous, Local cooling of high temperature components by a suspension of phase change material. ip.com Disclosure No. IPCOM000239650D, Publication Date: Nov. 21, 2014, pp. 1-2.

* cited by examiner

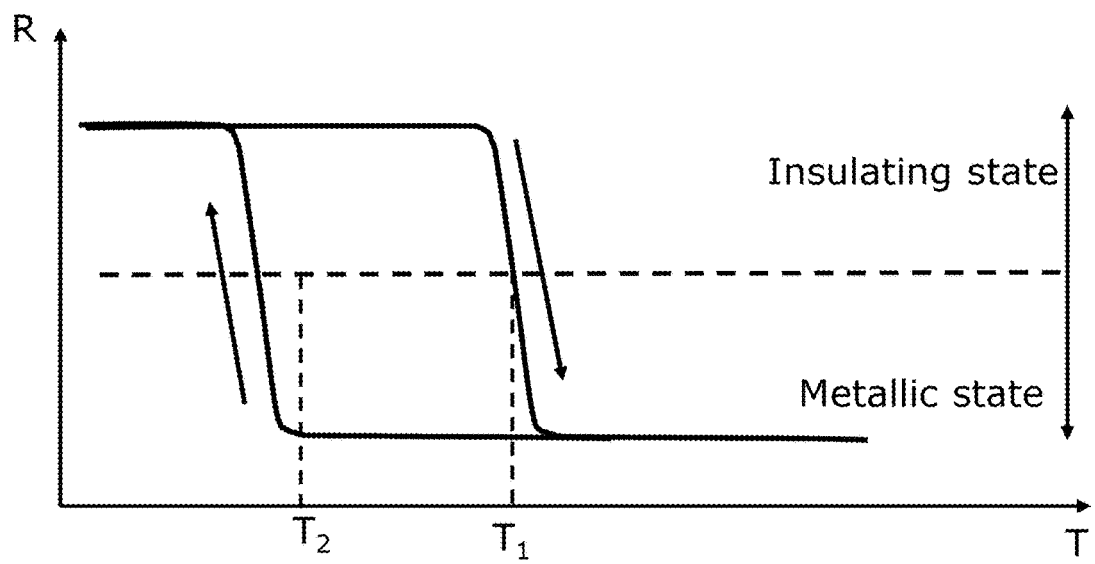
FIG. 5
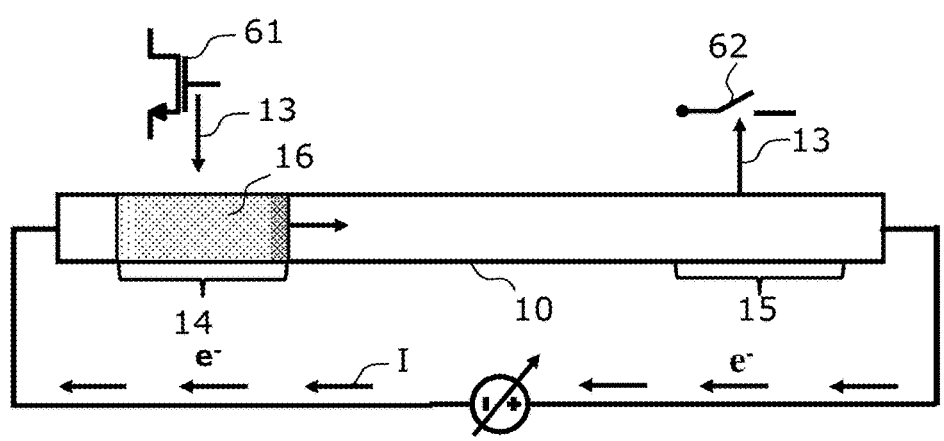
FIG. 6         600

SOLID-STATE LATENT HEAT PUMP SYSTEM

BACKGROUND

The present invention relates generally to a heat pump system and in particular to a heat pump system that can be used for the cooling/heating of micro- and nanoscale devices and structures.

Cooling of machines or devices is typically achieved by connecting the structure to be cooled with a cold thermal reservoir. The cooling power, however, is limited by the thermal conductance of the connecting material and therefore the transfer of sensible heat.

To achieve cooling powers beyond that possible by sensible heat transfer, latent heat pumps/heat pipes are known that transport latent heat using a liquid-gas transition, e.g. using water or halogenated hydrocarbons. The latent heat stored in a liquid phase or a gas phase is transported by a pressure gradient inside the heat pipe. However, such heat pipes are typically used for macroscopic applications only. They suffer from efficiency reduction when scaled down to microscale and nanoscale applications. Besides, as they are based on liquid/gas phase transitions, they are rather costly.

Furthermore, solid-state Peltier coolers are known. While such Peltier coolers are scalable to small structures and all solid-state, they have limited efficiency, low pumping power and are rather costly as well.

Accordingly, there is a need for other heat pump systems.

SUMMARY

According to a first aspect, the invention is embodied as a heat pump system comprising a structure comprising a solid-state phase change material. The solid-state phase change material has a first phase state and a second phase state dependent on the temperature. A heat source is configured to supply heat to a first area of the structure, thereby creating a first domain having the first phase state and thereby storing latent heat in the first domain. The first domain is separated by domain walls from second domains having the second phase state. A heat sink is configured to receive heat from a second area of the structure. Furthermore, an electrical energy supply is configured to supply an electrical current to the structure, thereby moving the first domain and the corresponding latent heat stored in the first domain along the structure from the first area to the second area.

According to embodiments of the invention both the first phase state and the second phase state are solid-state phases. Accordingly, the transition between the first phase state and the second phase state is a solid-solid phase transition. Embodiments of the invention allow transporting heat in solid-state structures. This may offer a broad variety of possible applications. In particular, it may facilitate an efficient and advanced manufacturing of such systems. Furthermore it allows the application of the heat pump system to micro- and nanoscale systems and devices. The latent heat is stored in the first domain and the transport of the latent heat is established by a movement of the first domain. The movement of the first domain is induced by an electrical current supplied by the energy supply. The energy supply may be a voltage source or a current source. The first phase state and the second phase state are different phase states.

The transition between the first solid phase state and the second solid phase state is embodied as a first order phase transition. A first order phase transition may be defined as a phase transition that involves the absorption or release of latent heat.

According to a preferred embodiment the first phase state is a metallic state and the second phase state is an insulating state. According to such an embodiment local Peltier effects can be used to move the first domain from the first area to the second area of the structure. More particularly, according to such an embodiment the heat source creates a metallic domain having a metallic state and the latent heat is stored in the metallic domain. The metallic domain is separated by domain walls from insulating domains having an insulating state. The electrical energy supply is configured to provide an electrical current to the structure. As a result, the metallic domain and the corresponding latent heat stored in the metallic domain is moved along the structure from the first area to the second area by means of local Peltier effects at the domain walls. More particularly, according to embodiments the electrical current is used as pump current to induce Peltier heating/cooling that is large enough to succeeding the phase transition temperatures of the solid-state phase change material. By locally heating one side of the first domain and cooling the other side, the first domain will start to move along the structure as long as the temperature of the structure is in-between the transition temperature of the phase transitions (from metallic to insulating and from insulating to metallic).

According to a preferred embodiment of such a metal-insulator material, the solid-state phase change material is a correlated oxide, in particular Vanadium Dioxide ($VO_2$). The transition temperature between the insulating phase state and the metallic phase state of $VO_2$ is approximately in a range between 65° C. and 75° C. which makes $VO_2$ a preferred choice for many applications. At room temperature, $VO_2$ is still well below the transition temperature and hence in the insulating state. And with some heating, $VO_2$ can easily and efficiently be brought above the transition temperature, thereby transition it to the metallic state and enabling the storage of latent heat.

Other preferred material choices are $V_4O_7$, $V_6O_{11}$, $V_2O_3$, $V_6O_{13}$, $V_5O_9$, VO, $V_8O_{15}$, $NbO_2$, $Ti_2O_3$, $LaCoO_3$, $Ti_3O_5$, $SmNiO_3$, $NdNiO_3$, $PrNiO_3$ or $Fe_3O_4$.

According to a preferred embodiment the heat source is an unsteady heat source operable to supply heat pulses to the first area.

Such an unsteady heat source does not permanently supply heat to the first area. If the unsteady heat source supplies a heat pulse, the heat is absorbed by the structure and a first domain, e.g. a metallic domain, can be created. After the heat pulse the temperature in the first area drops below the transition temperature from the second phase state, e.g. the insulating phase state, to the first phase state, e.g. the metallic phase state. This transition temperature from the second phase state to the first phase state will be in the following denoted as first transition temperature. This enables a depinning of the first domain, e.g. of the metallic domain, and a subsequent movement of the first domain along the structure. As an example, such an unsteady heat source could be a transistor of an integrated circuit.

According to a preferred embodiment the heat source is a steady heat source operable to supply steadily heat to the first area. Besides, the system comprises a thermal switch arranged between the steady heat source and the first area. The thermal switch is configured to control the heat transferred from the steady heat source to the first area.

According to such an embodiment the depinning of the first domain and the subsequent movement of the first domain along the structure can be initiated and controlled by the thermal switch. More particularly, when the thermal switch is closed, heat is supplied to the first area of the structure and the first domain is created. Then the thermal switch can be turned off so that no further heat is supplied to the first area or the heat supplied to the first area is at least reduced. As a result, the temperature in the first area drops below the first transition temperature from the second phase state to the first phase state and accordingly the first domain can be depinned and movement of the first domain can be initiated.

According to a preferred embodiment the heat pump system comprises a controller for controlling the thermal switch. In addition, the heat pump system is configured to apply thermal pulses to the first area and to adapt the timing of the thermal pulses to the duration of the movement of the first domain between the first and the second area.

According to such an embodiment the transfer of heat through the structure can be controlled and optimized by the controller. In particular, right after the arrival of a first domain at the second area and the annihilation of the arrived first domain, a new first domain may be depinned at the first area and send on its way to the second area.

According to preferred embodiments the thermal switch may be a device to switch between at least two thermal conductance states in response to a mechanical stimulus or an electrical stimulus.

According to a preferred embodiment the system comprises a controller for controlling the electrical energy supply. The controller is configured to control the amplitude and/or the frequency of the electrical current. This allows controlling the movement of the first domain during its motion along the structure. As an example, the amplitude of the electrical current will control the velocity of the first domain.

Generally the geometrical shape of the structure may have any desired form and any desired dimension. As the structure has always a solid-state, it can be flexibly adapted to the needs of the respective application. According to embodiments the structure may have the form of a rod. The rod may preferably have dimensions in the nanoscale or microscale. According to a preferred embodiment the structure may be a nanowire.

According to another preferred embodiment the system is configured to apply strain to the solid-state phase change material in the first area. This allows a tuning of the phase change characteristics of the structure in the first area. As an example, the switching behavior between the first phase state and the second phase state may be tuned according to the needs of the respective application. In particular the transition temperatures between the first phase state and the second phase state may be tuned.

According to another preferred embodiment the first area of the solid-state phase change material is doped to tune the phase change characteristics of the structure in the first area.

This is another way to tune the phase change characteristics of the structure in the first area according to the needs of the respective application. According to a preferred embodiment applying strain and applying doping may be combined.

According to a preferred embodiment the heat pump system is configured to keep the temperature of the first domain during its movement from the first area to the second area between a first transition temperature and a second transition temperature.

The transition behavior of the solid-state phase change material exhibits according to embodiments a hysteresis-behavior having a first and a second transition temperature between the first and the second phase state. The first transition temperature is the transition temperature from the second phase state to the first phase state and the second transition temperature is the transition temperature from the second phase state to the first phase state. By keeping the temperature of the first domain between the first transition temperature and the second transition temperature, a movement of the first domain is facilitated and concurrently it can be ensured that the first domain keeps its first phase state and hence keeps the latent heat stored in the first-state. However, at the boundaries between the two states the Peltier heat will raise/lower the temperature such that the material undergoes a transition locally at the boundary, thereby moving the boundary. The temperature can be e.g. kept in the desired range by suitable isolation measures of the structure.

According to a preferred embodiment the heat source is an electronic device. According to other preferred embodiment the heat source is an integrated circuit or an element of an integrated circuit.

According to another aspect a thermal computing device comprising a heat pump system according to the first aspect is provided. Preferably the first domain represents data that can be moved along the structure by the electric current.

According to a preferred embodiment the heat source may be implemented as write device that is configured to write the data represented by the first domain into the structure. The structure may be implemented as data link that is configured to transmit the data represented by the first domain. Furthermore, the heat sink is implemented as read device that is configured to read out the data represented by the first domain, thereby annihilating the first domain.

With such a thermal computing device heat can be used as source of information and the associated information can be further transmitted and processed. As an example, information that is dissipated as sensible heat during logic operations of CMOS devices can be locally stored as first domain and then be further processed by moving this first domain.

According to another aspect a method for moving latent heat in a heat pump system according to the first aspect is provided. The method comprises steps of supplying, by a heat source, heat to a first area of the structure, thereby creating a first domain having the first phase state and storing latent heat in the first domain, the first domain being separated by domain walls from second domains having the second phase state. The method comprises as further steps supplying, by an electrical energy supply, an electrical current to the structure; moving the first domain and the corresponding latent heat stored in the first domain along the structure from the first area to a second area of the structure and transferring heat from the second area of the structure to a heat sink, thereby annihilating the first domain.

According to another aspect a computer program product for operating a thermal computing device is provided. The thermal computing device comprises a heat pump system according to the first aspect. The computer program product comprises a computer readable storage medium having program instructions embodied therewith, the program instructions executable by the thermal computing device to perform a method comprising supplying, by a heat source, heat to a first area of the structure, thereby creating a first domain having the first phase state and storing latent heat in the first domain. The first domain is separated by domain walls from second domains having the second phase state. The method further comprises supplying, by an electrical energy supply, an electrical current to the structure, moving the first domain and the corresponding latent heat stored in the first domain along the structure from the first area to a second area of the structure and transferring heat from the second area of the structure to a heat sink. Thereby the first domain is annihilated.

Embodiments of the invention will be described in more detail below, by way of illustrative and non-limiting examples, with reference to the accompanying drawings.

BRIEF DESCRIPTION OF THE DRAWINGS

FIG. 5 illustrates in a schematic way an exemplary hysteresis-curve of a solid-state phase change material exhibiting a metallic-insulator phase transition;

FIG. 6 illustrates a thermal computing device according to an embodiment of the invention.

DETAILED DESCRIPTION

FIGS. 1a, 1b, 1c and 1d show a heat pump system 100 according to an embodiment of the invention, wherein the heat pump system 100 is in different states of latent heat transport.

Figure 1A:
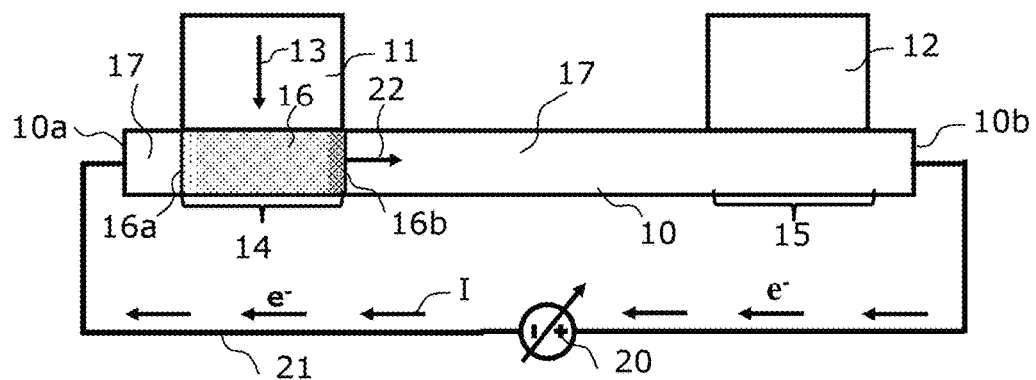
FIGS. 1a, 1b, 1c and 1d show a heat pump system according to an embodiment of the invention in different stages of latent heat transport.

Referring now to FIG. 1a, it shows the heat pump system 100 in an initial state. The heat pump system 100 comprises a structure 10 comprising a solid-state phase change material. The structure 10 provides a connection between a heat source 11 and a heat sink 12 and serves as transport structure for latent heat. The structure 10 is implemented as elongated rod, but may generally have any suitable form for connecting the heat source 11 and the heat sink 12. The heat source 11 may be e.g. an electric or electronic device, an integrated circuit or an element of an integrated circuit such as a transistor. The heat sink 12 may be e.g. a cold reservoir of an electric or electronic device that is configured to receive and absorb heat. The heat sink 12 may be e.g. embodied as a cooling plate or a cooling structure.

The solid-state phase change material has a first phase state and a second phase state. The respective phase state of the phase change material is dependent on the temperature and can hence be changed by heating or cooling the solid-state phase change material. In both the first and the second phase state the solid-state phase change material has a solid-state.

The heat source 11 is configured to supply thermal heat 13 to a first area 14 of the structure 10. It is assumed that without receiving heat from the heat source 11 the solid-state phase change material is in the second state. But if the heat source 11 supplies sufficient thermal heat to the first area 14 of the structure 10, the phase state of the solid-state phase change material in the first area 14 switches from the second phase state to the first phase state. The heat pump system 100 shown in FIG. 1a is in a state in which the heat source 11 has supplied sufficient heat to the first area 14 of the structure 10 to switch the solid-state phase change material of the structure 10 from the second phase state to the first phase-state. As a result, a first domain 16 of the first phase state has been created in the first area 14. The first domain 16 stores latent heat and is separated by domain walls 16a, 16b from the solid-state phase change material of the second phase state. The solid-state phase change material of the second phase state forms second domains 17 that surround the first domain 16.

The system 100 is now configured to transport the latent heat stored in the first domain 16 to a second area 15 of the structure 10 and the heat sink 12 is configured to receive the latent heat from the second area 15 of the structure 10.

For the transport of the latent heat an electrical energy supply 20 is provided. The electrical energy supply 20 may be e.g. implemented as current source or voltage source. The electrical energy supply 20 supplies an electrical current I to the structure 10. More particularly, the electrical energy supply 20 is arranged in an electrical supply circuit 21 that provides a flow of the electrical current I through the structure 10, and more specifically from a first end 10a of the structure 10 to a second end 10b of the structure 10. By the electrical current I the first domain 16 and the corresponding latent heat stored in the first domain 16 can be moved along the structure 10.

The solid-state phase change material of the structure 10 may be in particular a material that comprises metal-insulator phase transitions. A particularly preferred embodiment is vanadium dioxide ($VO_2$) that has at room temperature an insulating phase state and transitions to a metallic state at a first transition temperature of app. 65° C. to 75° C. According to such an embodiment the first phase state is a metallic state and the second phase state is an insulating state. Furthermore, the first domain 16 is a metallic domain and the second domain 17 is an insulating domain.

In the following it is assumed that the structure 10 comprises a material with metal-insulator phase transitions such as $VO_2$. According to such an embodiment local Peltier effects at the domain walls 16a and 16b can be used to move the first domain 16 from the first area 14 to the second area 15 of the structure 10. More particularly, the electrical energy supply 20 is used to move charge carriers (electrons, holes) through the structure 10. This induces local Peltier effects at the domain walls 16a, 16b of the metallic domain 16 previously created by absorption of heat 13 from the heat source 11. The electrical current I serves as pump current that induces Peltier heating/cooling being large enough to succeeding the phase transition temperatures of the material of the structure 10, e.g. of the vanadium dioxide. By locally heating one side of the metallic domain 16 and cooling the other side of the metallic domain 16, the metallic domain 16 will start to move/drift along the structure 11 as long as the temperature of the structure 11 is in-between the transition temperatures of the phase transitions of the material of the structure 10. More particularly, the temperature of the structure should be in-between the first transition temperature (from insulating to metallic) and the second transition temperature (from metallic to insulating). In other words, the Peltier effects at the domain walls 16a, 16b essentially re-shuffle latent heat from the left side of the metallic domain 16 (adjacent to the domain wall 16a) to the right side of the metallic domain 16 (adjacent to the domain wall 16b). This is illustrated in FIG. 1a with different shadings of the metallic domain 16. In an area on the left side the metallic domain 16 is colder than in a middle area of the metallic domain 16, while in an area on the right side the metallic domain 16 is warmer than in the middle area.

Figure 1B:
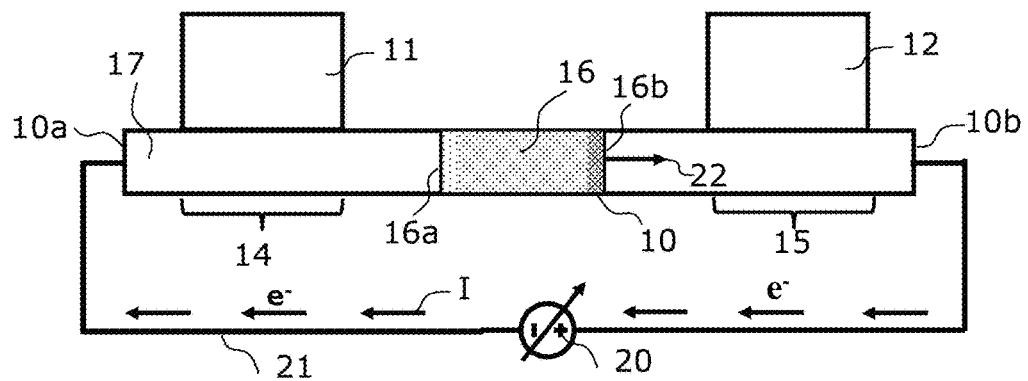

FIG. 1b shows the system 100 in a state in which the metallic domain 16 has been moved along the structure 10 and is now in between the first area 14 and the second area 15. The start of the movement of the metallic domain 16 has been initiated by a drop of the temperature of the metallic domain 16 in the first area 14 below the first transition temperature from the insulating phase state to the metallic phase state. This has enabled a depinning of the metallic domain 16 and a subsequent movement of the metallic domain 16 along the structure 10 in a direction 22 to the position now shown in FIG. 1b.

Figure 1C:
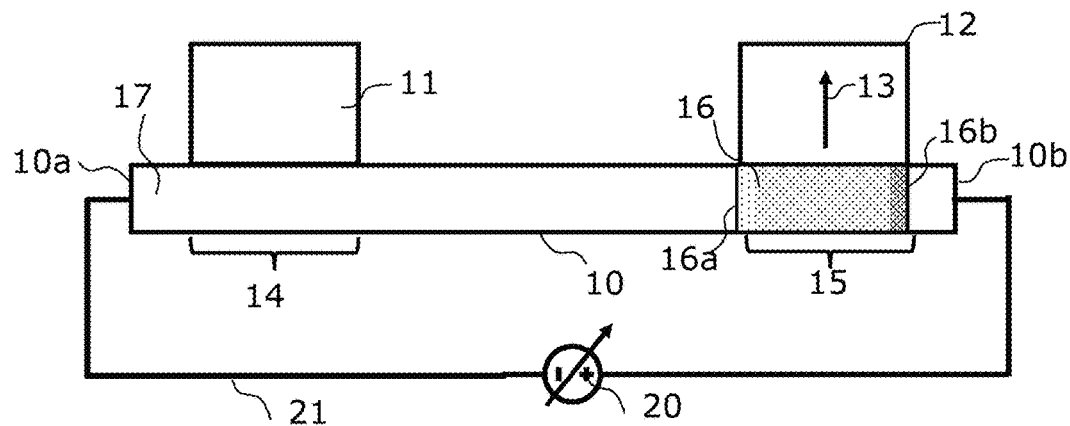

FIG. 1c shows the system 100 in a state in which the metallic domain 16 has been further moved along the structure 10 and has now reached the second area 15 of the structure 10. In this position the latent heat stored in the metallic domain 16 can be transferred to the heat sink 12. Accordingly the heat sink 12 receives the latent heat 13 from the metallic domain 16. In this stage the electrical current I is not needed and the electrical energy supply 20 could be switched off or reduced.

Figure 1D:
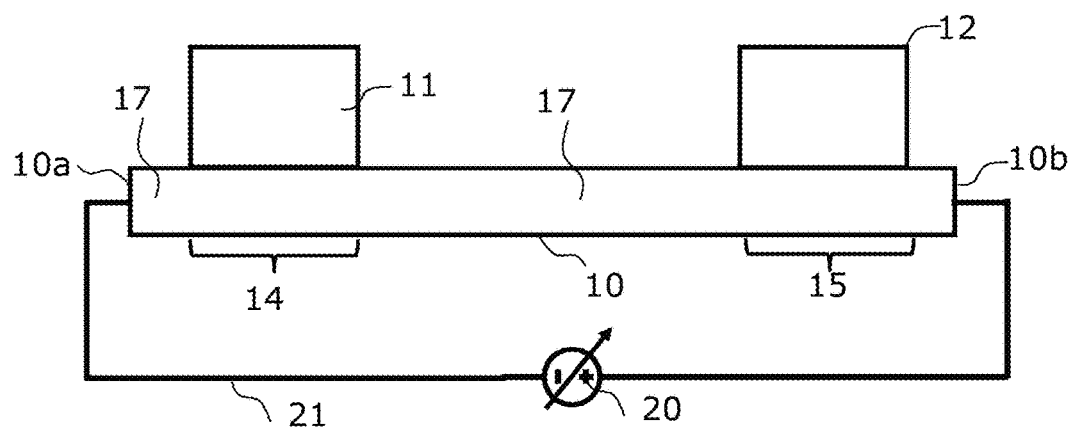

FIG. 1d shows the system 100 in a state in which the latent heat stored in the metallic domain 16 has been fully transferred to the heat sink 12. This has annihilated the metallic domain 16. Accordingly the structure 10 is fully in the second insulating phase state and the structure 10 comprises only an insulating domain 17 as second domain. In this stage the electrical current I is not needed and the electrical energy supply 20 could be switched off or reduced. Subsequently the cycle as described above could be started again by supplying heat from the heat source 11 to the first area 14.

Figure 2:
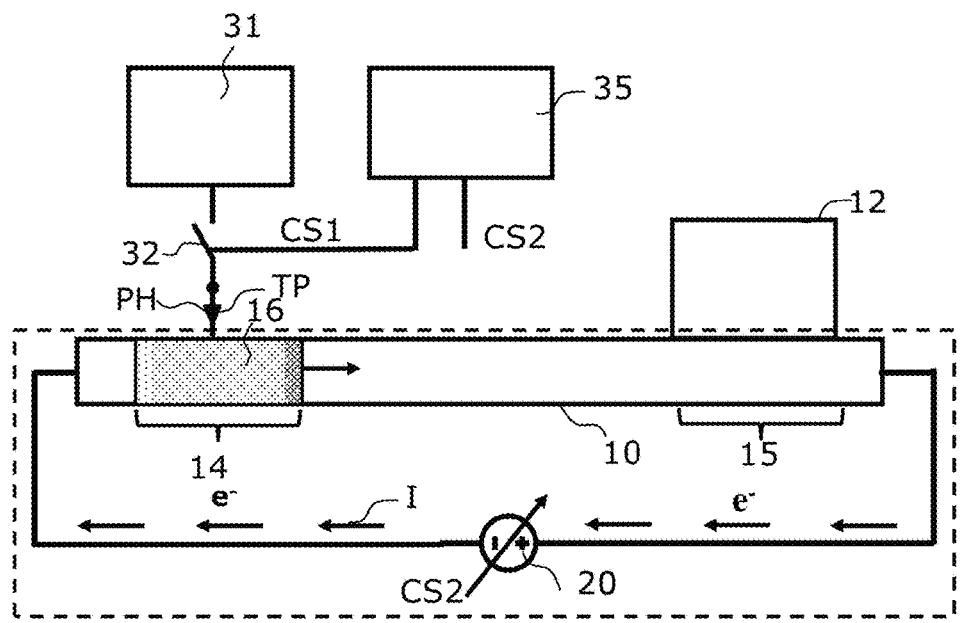
FIG. 2 shows a heat pump system according to another embodiment of the invention comprising a steady heat source and a thermal switch.

FIG. 2 shows a heat pump system 200 according to another embodiment of the invention. The heat pump system 200 comprises the structure 10 and the electrical energy source 20 as described above with reference to FIGS. 1a-1d. Instead of the unsteady heat source 11 system 200 comprises a steady heat source 31 operable to supply steadily heat to the first area 14. In addition, the system 200 comprises a thermal switch 32 which is arranged between the steady heat source 31 and the first area 14 of the structure 10. The thermal switch 32 is configured to control the heat transferred from the steady heat source 31 to the first area 14. The thermal switch 32 may be a device to switch between at least two thermal conductance states in response to a mechanical thermal stimulus or an electrical thermal stimulus . . . . In addition, the heat pump system 200 comprises a controller 35 for controlling the thermal switch 32. The controller 35 is configured to provide a control signal CS1 to the thermal switch 32 and to control the thermal switch 32 in such a way that thermal pulses TP are applied to the first area 14. The controller 35 is further configured to adapt the timing of the thermal pulses TP to the duration of the movement of the first domain 16 between the first area 14 and the second area 15 of the structure 10.

According to such an embodiment the controller 35 can control the heat supplied to the first area 14 and with that also the timing of the depinning of the first domain 16. When the thermal switch 32 is closed, the steady heat source 31 heats the first area 14 of the structure 10 and creates thereby the first domain 16. By opening the thermal switch 32, the heat supply to the structure 10 is interrupted. Accordingly the temperature in the first area 14 decreases and eventually drops below the first transition temperature. As a result, the first domain 16 can be depinned from the first area 14 and it can move along the structure 10 to the second area 15. Hence by controlling the thermal switch 32, the controller 35 can control the timing of the movement and optimize this movement in view of an optimal heat transfer from the heat source 11 to the heat sink 12. Preferably, right after the arrival of a first domain 16 at the second area 15 and the annihilation of the arrived first domain 16, a new first domain 16 may be depinned at the first area 14 and transferred to the second area 15. In a second preferred embodiment, a new first domain 16 may be created already shortly after a previous first domain 16 depinned at the first area 14, so that multiple first domains can be simultaneously transported between the first area 14 and the second area 15.

The controller 35 is also adapted to control the electrical energy supply 20 by a control signal CS2. In particular, the controller 35 may control the amplitude and/or the frequency of the electrical current I. As mentioned, the electrical current I may be e.g. switched off if no transport of first domains 16 is needed. Furthermore, the amplitude can be used to control the speed of the movement of the first domains 16. In addition, the current I provides a Joule-heating of the structure 10, in addition to the Peltier heating/cooling localized at the domain walls 16a and 16b. This Joule-heating can also be influenced and controlled by the amplitude of the current I and can be used to stabilize the temperature of the structure 10 to be in between the phase transition hysteresis.

Figure 3:
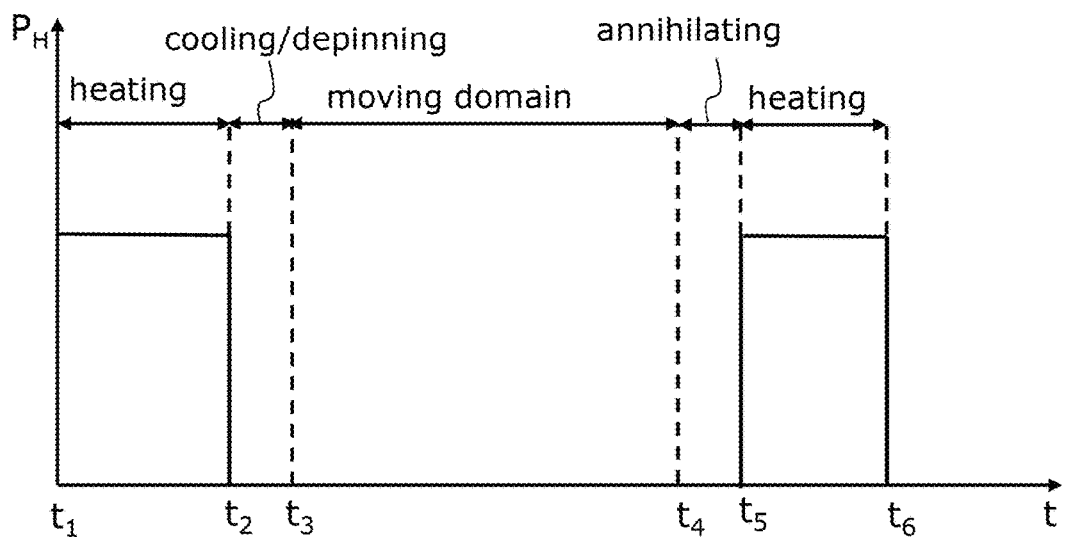
FIG. 3 shows an exemplary timing diagram of the heating power supplied by a heat source to a structure of the heat pump system.

FIG. 3 shows an exemplary timing diagram of the heating power $P_H$ supplied e.g. by the heat source 31 of FIG. 2 to the structure 10.

At a time $t_1$ the thermal switch 32 is closed and thermal heat is supplied to the first area 14 of the structure 10. At a time $t_2$, the thermal switch 32 is opened. Accordingly, the heat pulse ends and no further heat is supplied to the first area 14. Subsequently the temperature in the first area 14 drops and at a point in time $t_3$ the first domain 16 is depinned and starts to move towards the second area 15. At a point in time $t_4$, the first domain 16 has reached the second area 15. Then the latent heat is transferred to the heat sink 12 and at a point in time $t_5$ the first domain 16 has been annihilated and another heating cycle could start.

Figure 4A:
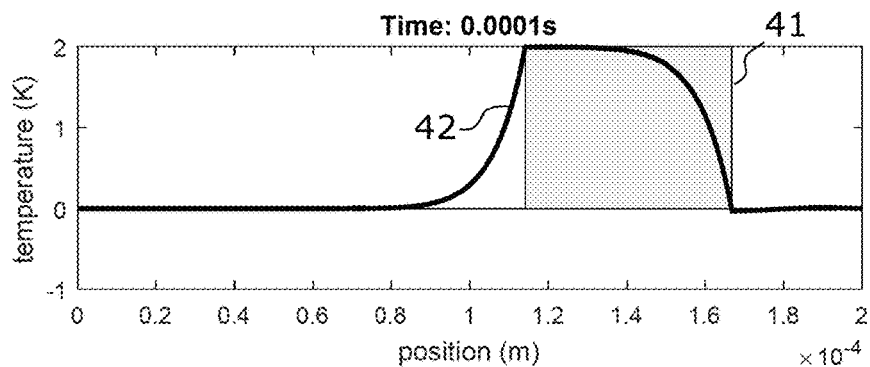
FIGS. 4a, 4b and 4c show an exemplary numerical simulation of a 1-dimensional heat equation of latent heat transport in a heat pump system according to an embodiment of the invention.
Figure 4B:
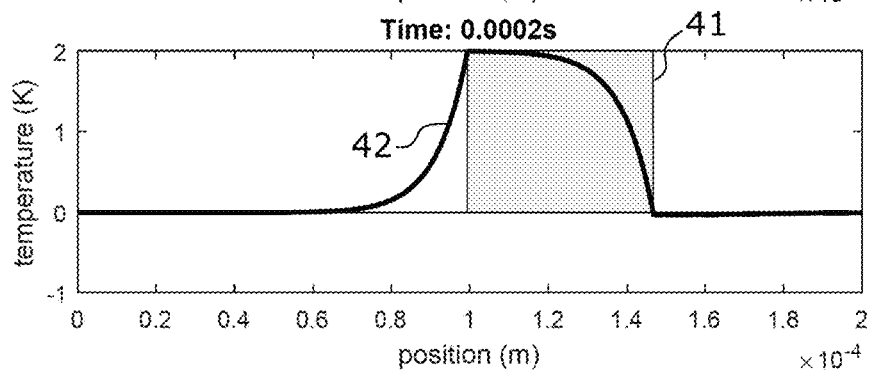
Figure 4C:
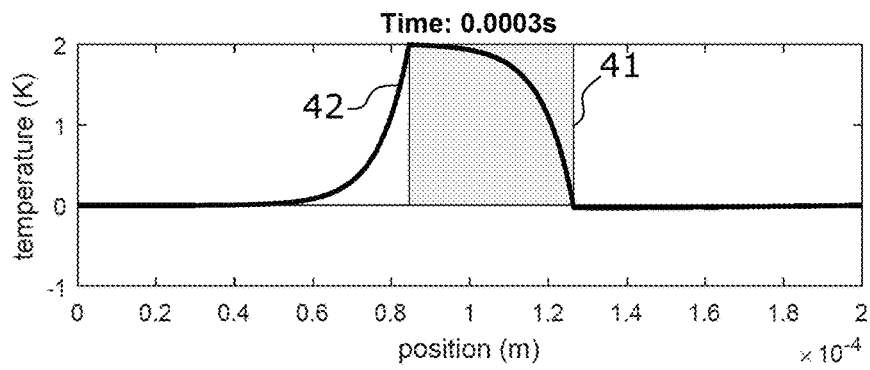

FIGS. 4a, 4b and 4c show an exemplary numerical simulation of a 1-dimensional heat equation of the structure 10. The heat equation reads as follows:

$$\rho c_P \frac{\partial T}{\partial t} - \nabla(k\nabla T) = \dot{q}_V,$$

where T denotes the temperature as a function of position, $\rho$ is the density, $c_p$ is the heat capacity, k is the thermal conductivity, t is time and $\dot{q}_V$ is the volumetric heat flux.

For the simulation the following parameters have been used:

The structure 10 is assumed to be a $VO_2$ wire that is 200 μm long and that has a diameter of 100 nm. Furthermore, it is assumed that an electrical current I of 10 μA is supplied as driving current by the electrical energy supply 20. The temperature plotted is an average temperature across the wire cross section and quantified with respect to the transition temperature T2, here set to 0 K, such that the second transition temperature T1 is at 2 K.

The horizontal x-axis denotes the position of the first domain 16 on a $10^{-4}$ m scale. The y-axis denotes the temperature of the structure 10 in K with respect to the lower second transition temperature (from the first/metallic phase state to the second/insulating phase state) of the solid-state phase change material of the structure 10. FIG. 4a shows the simulation at a point in time of 0.0001 s, FIG. 4b shows the simulation at a point in time of 0.0002 s and FIG. 4c shows the simulation at a point in time of 0.0003 s.

The shaded area 41 illustrates the position of the first domain, while the line 42 shows the profile of the temperature rise with respect to the lower second transition temperature. The speed of movement of the first domain is about 1.5 m/s As can be seen in FIGS. 4a, 4b and 4c, domains can move latent heat initially absorbed from a heat source, similar to water vapor moving along a pressure gradient inside a copper heat pipe. The Peltier effects at the domain walls essentially re-shuffle latent heat from one side of the domain to the other side. As a simplified analogy, it may be considered similar to heating an iceberg on one side and freezing all the meltwater to the other side, which leads to a net displacement of the iceberg including a displacement of the latent heat stored in the iceberg.

FIG. 5 illustrates in a schematic way an exemplary hysteresis-curve of a solid-state phase change material exhibiting a metallic-insulator phase transition.

The horizontal axis represents the material temperature T of the solid-state phase change material and the vertical axis the resistance R of the phase change material.

Starting from the insulating state, the phase change material transitions from the insulating state to the metallic state at a first transition temperature T1. In the other direction, the phase change material transitions from the metallic state to the insulating state at a second transition temperature T2. The second transition temperature T2 is lower than the first transition temperature T1.

FIG. 6 illustrates a thermal computing device 600 according to an embodiment of the invention. The thermal computing device 600 may comprise e.g. a heat pump system 100 as illustrated with reference to FIG. 1a. The heat source is embodied as a transistor 61. According to other embodiments it may be other logic circuitry of e.g. a CMOS device. The information dissipated as sensible heat during the switching of the transistor 61 (or during logic operations of other CMOS devices) can be locally stored by the computing device 600 as latent heat in the first domain 16. The first domain 16 represents data that can be moved along the structure 10 by the electric current I. Accordingly transistor 61 functions as write device that writes the data represented by the first domain 16 into the structure 10. The structure 10 between the first area 14 and the second area 15 serves as data link that transmits the data represented by the first domain 16 to the heat sink. The heat sink is embodied as electrical switch 62 that can be triggered by thermal heat. This could be e.g. a bimetallic thermal switch that opens upon receiving a predetermined amount of heat. According to other embodiments a thermal electrical switch may be used that closes upon receiving a predetermined amount of heat. The electrical switch 62 receives the latent heat stored in the first domain 16 and is thereby triggered. Accordingly the electrical switch 62 serves as read device that is configured to read out the data represented by the first domain 16.

Figure 7:
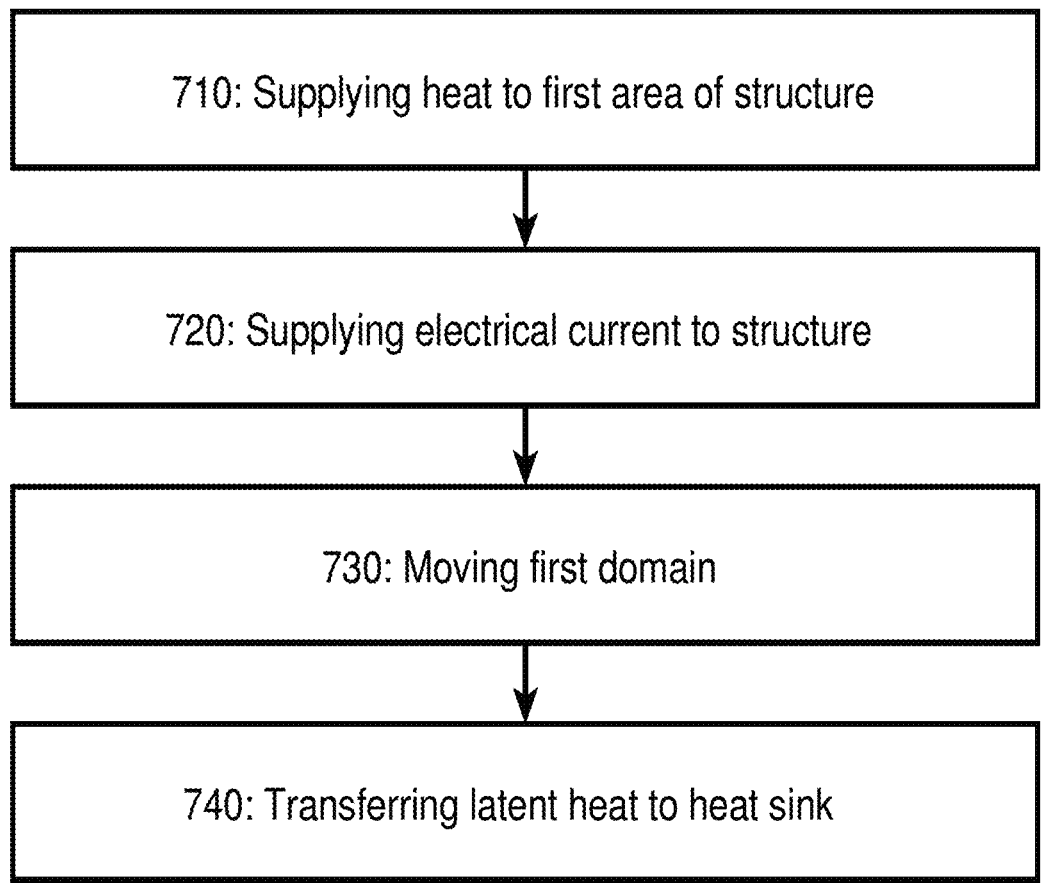
FIG. 7 shows a flow chart of method steps of a method for moving latent heat.

FIG. 7 illustrates method steps of a method for moving latent heat in heat pump systems, e.g. in the heat pump systems 100 and 200 as described above.

At a step 710, the heat source 11 supplies heat to the first area 14 of the structure 10. This creates a first domain 16 of the first phase state, e.g. the metallic phase state. Thereby latent heat is stored in the first domain 16.

At a step 720, the electrical energy supply 20 supplies an electrical current to the structure 10.

At a step 730 the electrical current moves the first domain 16 and the corresponding latent heat stored in the first domain 16 along the structure 10 from the first area 14 to the second area 15 of the structure 10.

At a step 740, the latent heat stored in the first domain 16 is transferred from the second area 15 of the structure 10 to the heat sink 12. Thereby the first domain 16 is annihilated.

The present invention may be a system, a method, and/or a computer program product. The computer program product may include a computer readable storage medium (or media) having computer readable program instructions thereon for causing a processor to carry out aspects of the present invention.

The invention may be in particular embodied as a computer program product for operating a thermal computing device, e.g. the thermal computing device as described with reference to FIG. 6.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A heat pump system comprising:
a structure comprising a solid-state phase change material, the solid-state phase change material having a first phase state and a second phase state dependent on the temperature;
a heat source configured to supply heat to a first area of the structure, thereby creating a first domain having the first phase state and storing latent heat in the first domain, the first domain being separated by domain walls from second domains having the second phase state;
a heat sink configured to receive heat from a second area of the structure; and
an electrical energy supply configured to supply an electrical current to the structure, thereby moving the first domain and the corresponding latent heat stored in the first domain along the structure from the first area to the second area.

2. The heat pump system according to claim 1, wherein the first phase state is a metallic state and the second phase state is an insulating state.

3. The heat pump system according to claim 2, wherein the solid-state phase change material is selected from the group consisting of $VO_2$, $V_4O_7$, $V_6O_{11}$, $V_2O_3$, $V_6O_{13}$, $V_5O_9$, $VO$, $V_8O_{15}$, $NbO_2$, $Ti_2O_3$, $LaCoO_3$, $Ti_3O_5$, $SmNiO_3$, $NdNiO_3$, $PrNiO_3$ and $Fe_3O_4$.

4. The heat pump system according to claim 1, wherein the heat source is an unsteady heat source operable to supply heat pulses to the first area.

5. The heat pump system according to claim 1, wherein the heat source is a steady heat source operable to steadily supply heat to the first area, wherein the system comprises a thermal switch arranged between the steady heat source and the first area, the thermal switch being configured to control the heat transferred from the steady heat source to the first area.

6. The heat pump system according to claim 5, wherein the heat pump system comprises a controller for controlling the thermal switch and wherein the heat pump system is configured to
apply thermal pulses to the first area; and
adapt the timing of the thermal pulses to the duration of the movement of the first domain between the first and the second area.

7. The heat pump system according to claim 5, wherein the thermal switch is a device to switch between at least two thermal conductance states in response to a mechanical stimulus or an electrical stimulus.

8. The heat pump system according to claim 1, wherein the system comprises a controller for controlling the electrical energy supply and wherein the controller is configured to control the amplitude and/or the frequency of the electrical current.

9. The heat pump system according to claim 1, wherein the structure is a nanowire.

10. The heat pump system according to claim 1, wherein the system is configured to apply strain to the solid-state phase change material in the first area, thereby tuning the phase change characteristics of the structure in the first area.

11. The heat pump system according to claim 1, wherein the first area of the solid-state phase change material is doped to tune the phase change characteristics of the structure in the first area.

12. The heat pump system according to claim 1, wherein the system is configured to keep the temperature of the first domain between a first transition temperature and a second transition temperature during its movement from the first area to the second area.

13. The heat pump system according to claim 1, wherein the heat source is an electronic device.

14. The heat pump system according to claim 1, wherein the heat source is an integrated circuit or an element of an integrated circuit.

15. A thermal computing device comprising a heat pump system, said heat pump system in turn comprising:
    a structure comprising a solid-state phase change material, the solid-state phase change material having a first phase state and a second phase state dependent on the temperature;
    a heat source configured to supply heat to a first area of the structure, thereby creating a first domain having the first phase state and storing latent heat in the first domain, the first domain being separated by domain walls from second domains having the second phase state;
    a heat sink configured to receive heat from a second area of the structure; and
    an electrical energy supply configured to supply an electrical current to the structure, thereby moving the first domain and the corresponding latent heat stored in the first domain along the structure from the first area to the second area.

16. The thermal computing device according to claim 15, wherein the first domain represents data that can be moved along the structure by the electric current.

17. The thermal computing device according to claim 15, wherein
    the heat source is implemented as write device that is configured to write the data represented by the first domain into the structure;
    the structure is implemented as a data link that is configured to transmit the data represented by the first domain; and
    the heat sink is implemented as a read device that is configured to read out the data represented by the first domain, thereby annihilating the first domain.

18. A method for moving latent heat in a heat pump system, the heat pump system comprising a structure comprising a solid-state phase change material, the solid-state phase change material having a first phase state and a second phase state dependent on the temperature; the method comprising
    supplying, by a heat source, heat to a first area of the structure, thereby creating a first domain having the first phase state and storing latent heat in the first domain, the first domain being separated by domain walls from second domains having the second phase state;
    supplying, by an electrical energy supply, an electrical current to the structure;
    moving the first domain and the corresponding latent heat stored in the first domain along the structure from the first area to a second area of the structure; and
    transferring heat from the second area of the structure to a heat sink, thereby annihilating the first domain.

19. The method according to claim 18, the method further comprising:
    applying thermal pulses to the first area; and
    adapting the timing of the thermal pulses to the duration of the movement of the first domain between the first and the second area.

20. A computer program product for operating a thermal computing device, the thermal computing device comprising a heat pump system, the heat pump system comprising a structure comprising a solid-state phase change material, the solid-state phase change material having a first phase state and a second phase state dependent on the temperature, said computer program product comprising a non-transitory computer readable storage medium having program instructions embodied therewith, the program instructions executable by the thermal computing device to perform a method comprising:
    supplying, by a heat source, heat to a first area of the structure, thereby creating a first domain having the first phase state and storing latent heat in the first domain, the first domain being separated by domain walls from second domains having the second phase state;
    supplying, by an electrical energy supply, an electrical current to the structure;
    moving the first domain and the corresponding latent heat stored in the first domain along the structure from the first area to a second area of the structure; and
    transferring heat from the second area of the structure to a heat sink, thereby annihilating the first domain.

* * * * *